ELECTRONIC MULTIPLIER

Filed Nov. 30, 1954 3 Sheets-Sheet 1

INVENTOR
JAMES W. FOLLIN, JR.

BY Harold T. Stowell
ATTORNEY

Feb. 6, 1962 J. W. FOLLIN, JR 3,019,982

ELECTRONIC MULTIPLIER

Filed Nov. 30, 1954 3 Sheets-Sheet 2

INVENTOR
JAMES W. FOLLIN, JR.

BY Harold T. Stowell

ATTORNEY

INVENTOR
JAMES W. FOLLIN, JR.

BY Harold T. Stowell

ATTORNEY

United States Patent Office 3,019,982
Patented Feb. 6, 1962

3,019,982
ELECTRONIC MULTIPLIER

James W. Follin, Jr., Silver Spring, Md., assignor to Research Corporation, New York, N.Y., a corporation of New York Filed Nov. 30, 1954, Ser. No. 471,972
5 Claims. (Cl. 235—194)

The present invention relates to an electronic method and apparatus for obtaining an arithmetical function of two voltages. More specifically, this invention relates to a means of obtaining a periodic voltage whose average value is proportional to the product or other arithmetical function of two or more variable voltages.

The rapidly developing field of analogue computers has for some time required an accurate method of electronic multiplication. The present method of multiplying two variables employs an electrical-mechanical system involving a potentiometer whose arm is positioned by a servo motor. Since the servo motor has a very limited response to time varying input voltages, the use of a servo multiplier cannot be extended into regions where the frequencies of the motor input exceeds the servo motor's ability to respond. For example, when a sinusoidal wave at a frequency of 2 c.p.s. and an amplitude of 10 volts is applied to a servo multiplier of the type in present use, an error of greater than 300 percent appears in the output. It is needless to say that such an error cannot be tolerated in a computing system whose results are expected to be accurate to within 1% or less.

Ordinarily, if it were expected that frequencies beyond the tolerable amount would be present, a time scale transformation could be performed in which all phenomena would occur at a slower rate and then the results could be interpreted on a real time basis by multiplying all time scales by a constant number. A transformation of this sort is quite satisfactory for computations performed solely within the machine. Recently use has been made of analogue computers in the field involving the dynamic analysis of closed loop regulating devices. Certain components of the system under study, together with a computing machine arranged to simulate other components and solve equations of kinematics, form the complete system for analysis. Inasmuch as a time scale transformation cannot be accomplished with respect to the actual components, an analysis of this sort must be carried out on a real time basis. It is evident that in such applications computers employing servo multipliers can be used only to a limited extent. The present invention was made to supply the need for an improved multiplying device so that analogue computers could embrace even wider fields of application.

Accordingly, it is an object of the present invention to provide accurate electronic means for obtaining a voltage proportional to the product of two independently variable voltages.

A further object of the present invention is to provide a multiplier capable of responding to input frequencies of the order of 30 c.p.s.

Still another object of the present invention is the provision of an electronic multiplier formed of amplifiers which can readily be adapted to other computing uses when their assembly as a multiplier is not required.

Another object is to provide a stable electronic analogue computer capable of performing the arithmetic operations of multiplication, division, and square rooting.

The above and other objects are accomplished by providing a time varying voltage of triangular basic wave form and biasing this wave form by an amount proportional to one of the factors of a desired multiplication, while limiting the resultant wave form by an amount proportional to the other factor to produce an output whose average value is proportional to the product of the two factors. This average value can readily be derived from the output of a filter into which the resultant wave form is fed. The same basic multiplier circuit, with additional similar components added, is also used to perform the other arithmetic operations as will be shown in detail below.

The principles of the invention are illustrated in the accompanying drawings in which.

Figure 1:
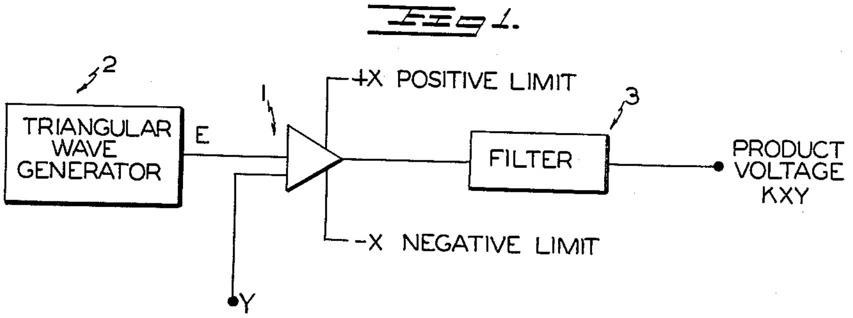
FIG. 1 is a block diagram of one form of an electronic multiplier embodying the principles of the invention.
Figure 2:
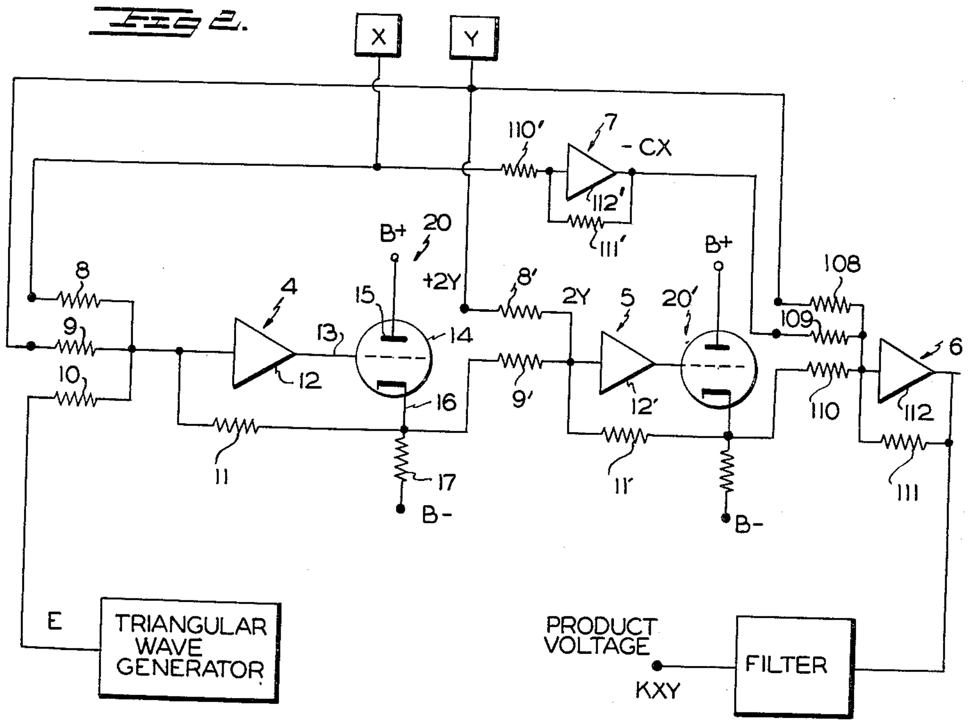
FIG. 2 is a diagram, generally in block form, of a modified form of the electronic multiplier of the invention.
Figure 3A:
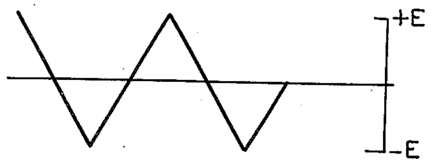
Figure 4:
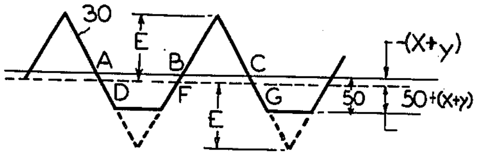
Figure 3B:
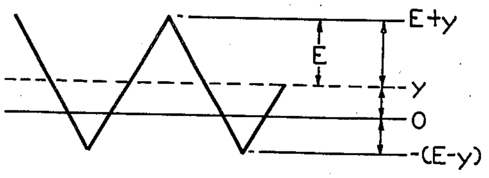
Figure 5:
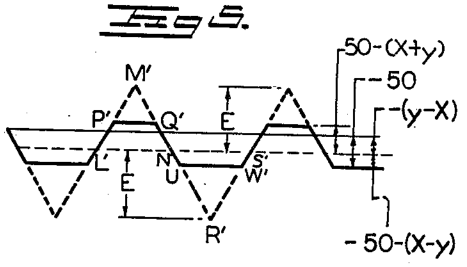
Figure 3C:
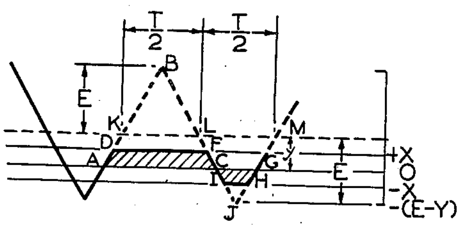
Figure 6:
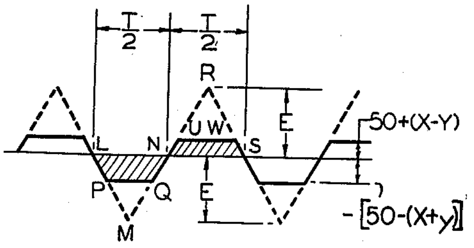
Figure 7:
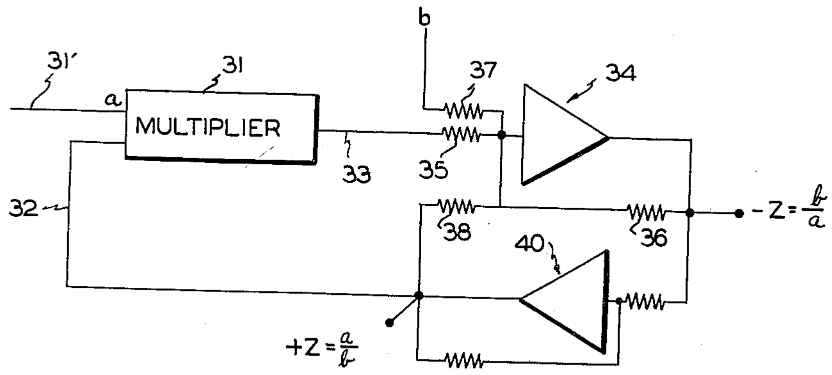
Figure 8:
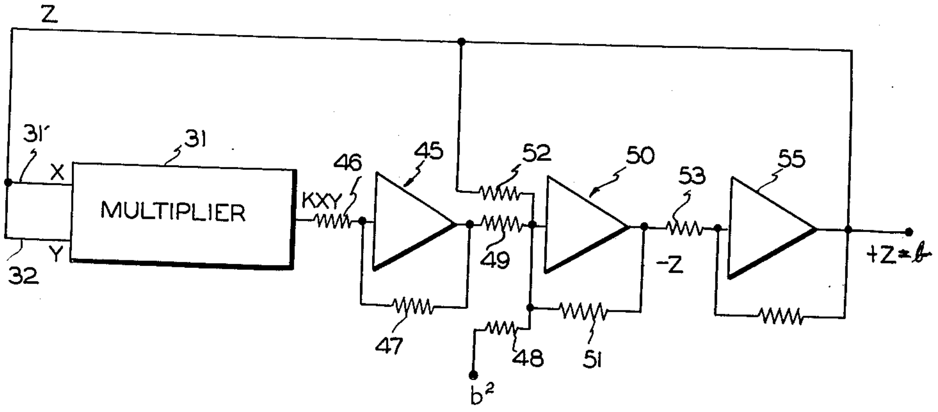

FIGS. 3A, 3B, and 3C illustrate the development of the waveform of the output of the multiplier shown in FIG. 1;

FIG. 4 illustrates a waveform of the output of the first amplifier of the multiplier of FIG. 2;

FIG. 5 illustrates the waveform of the output of the second amplifier of the multiplier of FIG. 2;

FIG. 6 illustrates the waveform of the third amplifier of the multiplier of FIG. 2;

FIG. 7 is a block diagram showing the multiplier of the invention adapted to use as a divider; and FIG. 8 is a block diagram showing the multiplier of the invention used for the purpose of extracting square roots.

Broadly speaking, the operation of the multiplier of the invention involves two elements. The first element is means providing a periodic voltage having a linear, triangular waveform of the order of 100 volts amplitude at a frequency of the order of 1000 c.p.s. The second basic element is an amplifier or group of amplifiers arranged to form a circuit capable of adding a voltage to the triangular wave which voltage is a variable voltage whose product with a second variable voltage is desired. The amplifier must also be capable of limiting the sum of the triangular wave and the first variable to a value equal in amplitude to a second variable voltage.

A basic multiplier circuit embodying the principles of the invention is shown in FIG. 1. A limiting amplifier 1 provides an output voltage equal to the sum of the input voltages when the magnitude of the sum is less than the limit voltage level $x$, and equal to the limit voltage when the magnitude of the sum of the inputs exceed the limit voltage level $x$. The input voltages include the output E of the triangular wave generator 2 and a variable voltage $y$. A filter 3 measures the average value of the output of limiting amplifier 1 and thereby provides an output voltage proportional to the product of the $x$ and $y$ voltages.

The development of the waveform of the multiplier output voltage can be seen in FIG. 3. FIG. 3A shows the waveform of the linear triangular wave. For present purposes both variables $x$ and $y$ will be regarded as constant voltages during one cycle of the triangular carrier E. FIG. 3B depicts the output of the multiplier as it would appear were it not for the limiting function of the amplifier, a bias $y$ being added to the input E. The cross hatched area of FIG. 3C shows the actual output of the multiplier circuit in which limits equal to $+x$ and $-x$ are applied to the output waveform of FIG. 3B. The average value of the output of the multiplier represents the desired product $xy$. This can be demonstrated by the following considerations.

The time average value of the output of the multiplier is equal to the area of trapezoid ADFC less the area of trapezoid CGHI divided by the time AG. The area of trapezoid ADFC is equal to the area of triangle ABC less the area of triangle DBF. The area of trapezoid CGHI is equal to the area of triangle CGJ less the area of triangle IHJ. The areas of the various triangles involved can be found by applying principles of plane geometry, noting first that all the triangles involved in this proof are similar.

The altitude of triangle $KBL=E$.

The altitude of triangle $ABC=E+y$.

The altitude of triangle $DBF=E+y-x$.

The altitude of triangle $CGJ=E-y$.

The altitude of triangle $IHJ=E-y-x$.

The base of triangle $$KBL=\frac{T}{2}$$

where T is the period of the triangular wave.

Since triangle ABC is similar to triangle KBL, the base of triangle ABC, line AC, $$=\frac{T}{2}\frac{(E+y)}{E}$$

likewise, the base of triangle DBF, line DF, $$=\frac{T}{2}\frac{(E+y-x)}{E}$$

Triangle CGJ is similar to triangle LMJ, therefore, the base of triangle $$CGJ=\frac{T}{2}\frac{(E-y)}{E}$$

and, the base of triangle $$IHJ=\frac{T}{2}\frac{(E-y-x)}{E}$$

The area of trapezoid ADFC can be obtained by solving for the difference between the area of triangle ABC and the area of triangle DBF, therefore, the area of trapezoid $$ADFC=\frac{T}{4E}(2Ex+2xy-x^2)$$

The area of trapezoid CGHI can be found by solving for the difference between the area of triangle JKD and the area of triangle LMD, therefore, the area of trapezoid $$CGHI=\frac{T}{4E}(2Ex-2xy-x^2)$$

The net area of the output waveform is therefore $$\frac{T}{E}xy$$

and the average value for one cycle of the triangular wave is $$\frac{xy}{E}$$

A simple resistance-capacitor filter has the property of measuring the average value with respect to time of an an input voltage. Thus, an output voltage proportional to the product of two variable voltages may be obtained by passing a voltage from a limiting device as described above through a filter, the output of which represents the time-average of the input.

The foregoing proof, it is realized, is not a rigorous one for the reason that the $x$ and $y$ voltages are regarded as constants. Experiment has verified, however, that the capabilities of the multiplier far exceed those of servo driven types in multiplying two varying voltages. The experimental results may be interpreted in the light of the above proof when it is remembered that relative to the period of the triangular carrier wave, the period of the multiplicand voltage is of the order of 30 or more times as great and hence the variation in the multiplicand must be small during one cycle of the carrier.

A disadvantage of this sort of multiplier is that it is capable of multiplying in only two quadrants. That is to say, absurd results would be obtained if the $x$ voltage were permitted to change sign since it would involve imposing a negative level as the positive limit upon the output of the multiplier. Appropriation variations in the sign of the product would occur for variations in the sign of the $y$ voltage however, and so the multiplier may be said to be a two quadrant multiplier.

FIG. 2 shows a more elaborate multiplier embodying an arrangement of amplifiers, some of which are designed to limit at a fixed negative level, which permits operation in four quadrants in generally the same manner as described with reference to FIG. 1. This circuit comprises four direct coupled computer amplifiers, shown generally at 4, 5, 6 and 7. The combination of input resistors, a feedback resistor and a high gain amplifier forms a well known type of computing amplifier. The voltage appearing at the output of a computing amplifier is related to the voltage applied to an input resistor in the following manner:

$$E_o=E_i\frac{\mu R_f}{1-\mu R_i} \quad (1)$$

where $E_o$ is the output voltage
$E_i$ is the input voltage
$\mu$ is the amplifier gain
$R_f$ is the feedback resistor, and
$R_i$ is the input resistor, but since $\mu$ is very large, this expression may be written as $$E_o=-E_i\frac{R_f}{R_i} \quad (2)$$

Moreover, for a number of input voltages and input resistors, the output voltage is $$E_o=\left[-E_i\left(\frac{R_f}{R_i}\right)+E_i'\left(\frac{R_f}{R_i'}\right)+E_i''\left(\frac{R_f}{R_i''}\right)\right] \quad (3)$$

if $R_f=R_i$ $$E_o=-[+E_i+E_i'+E_i''] \quad (4)$$

The formulas appearing above are linear expressions which will obtain provided the output voltage is not required to be great enough so that the high gain amplifier becomes saturated. To assure that linear operation does prevail, the voltage levels applied to the input resistors are adjusted so that the output voltage is not required to exceed 100 volts positive or negative.

In FIG. 2, the input voltages $x$ and $y$ are shown generally for the reason that they may derive from a variety of sources in practice. For instance, the $x$ voltage might represent the output of a potentiometer attached to a mechanically driven shaft, while the $y$ voltage might represent the output of another computing amplifier.

Referring first to computer amplifier 4, a first variable input $x$, a second variable input $y$, and the output E of a triangular wave generator are applied to input resistors 8, 9, and 10, respectively, which together with one end of a feedback resistor 11, are connected to the input of a high gain amplifier 12 consisting of an odd number of amplifying stages so that its output voltage is opposite in sign to its input voltage. The output of the high gain amplifier 12 is applied to the input 13 of cathode follower 20. The anode 15 of the electron tube 14 is directly connected to a source of positive voltage, shown as B+, and the cathode 16 of the tube 14 is connected to a source of negative voltage, B−, through a cathode load resistor 17. The output end of the feedback resistor 11 is connected to the cathode 16 of the electron tube 14. The output voltage of computing amplifier 4 appears at the cathode 16 of the cathode follower 20.

The effect of combining a cathode follower with a computing amplifier in this manner is to produce an asymmetrically limiting amplifier. Since the cathode follower is included within a feedback loop and preceded by a high gain amplifier, the overall characteristics of such an amplifier are linear to a high degree for voltages greater than the B— potential, but less than the B+ potential. The B+ potential is chosen to be beyond the normal operating range of the amplifier. The B— potential is chosen to be within the operating range of the computer amplifier and equal to the value at which the output of the amplifier is to be limited.

The cathode follower, connected as shown, limits the output by virtue of the fact that it operates as a valve controlling the flow of current from the B+ source through the cathode load resistor to the B— source. As the voltage applied to the grid becomes increasingly negative, the impedance ofthe tubes rises permitting less current to flow from the B+ source into the load resistor and thus resulting in the appearance of a more negative voltage at the cathode. When cutoff is reached, the potential appearing at the cathode is equal to the B— voltage which is the minimum voltage obtainable from the cathode follower.

FIG. 4 illustrates the waveform of the output of the first limiting amplifier stage comprising computer amplifier 4 and cathode follower 20, which consists of a biased triangular wave 30, limited at —50 volts. Line ABC is the zero voltage axis and line DFG is the axis of symmetry of the triangular wave which is shown displaced from the zero axis by an amount $-(x+y)$ and is shifted in phase by 180° from the input wave. A triangular wave having an amplitude of 100 volts and frequency of 1000 cycles per second is satisfactory for the input wave.

For the sake of convenience in further discussion, the term "axis of symmetry" will be retained even though it is obvious that the wave shape is no longer symmetrical due to the limiting. The axis of symmetry as used herein may be considered as the voltage level which marks equal time T/2 for output voltage greater or less than that voltage. The axis of symmetry is always displaced from the zero axis an amount equal to the sum of the direct voltages in the output.

Again referring to FIG. 2, the output of the first limiting amplifier stage together with the quantity of $y$ voltage, twice the magnitude and of the same sign as that supplied to computer amplifier 4, provide the inputs to the second computer amplifier 5. Amplifier 5 is identical in construction with amplifier 4, having input resistors 8′, 9′, a feedback resistor 11′, a high gain amplifier 12′, and as before a cathode follower 20′ is connected to the output of amplifier 5 to act as a limiter. It should be noted that in accordance with Equation 3, the required gain by which the magnitude of $y$ must be increased, can be obtained by providing that the ratio of the resistance of the feedback resistor to the resistance of the input resistor is equal to the desired gain.

The output of the second limiting amplifier stage appears in FIG. 5. The output consists of the inverted voltage wave of the output the first limiting amplifier stage with the axis of symmetry displaced additionally $-2y$ so that the net displacement is $x-y$. The negative output is limited to —50 volts.

Amplifier 6 is a well known form of computing amplifier differing from amplifiers 4 and 5 in that the output end of the feedback resistor 111 is connected directly to the output of the high gain amplifier 112. The output of the high gain amplifier 112 is also the source of output voltage from the computing amplifier. Amplifier 6 functions to provide an output voltage equal to the sum of the input voltages in the manner expressed by Equation 3. Since the cathode followers 20 associated with amplifiers 4 and 5 are omitted in the case of amplifier 6, no limiting of the output voltage is provided.

The output of the second limiting amplifier stage is summed in amplifier 6 together with an amount of $y$ voltage equal to and of the same sign as that supplied to the computer amplifier 4, and also together with an adjusted amount of $x$ voltage opposite in sign to that supplied to the said computer amplifier. Computer amplifier 7, which is identical in construction with computer amplifier 6, is provided for the purpose of inverting the $x$ voltage. Inasmuch as the gain of amplifier 7 must be adjusted to a value other than unity, the necessary adjustment can be accomplished conveniently by causing the ratio of the value of the feedback resistor 111′ to the value of the input resistor 110′ to be equal to the desired gain.

FIG. 6 illustrates the waveform of the output of the amplifier 6 which consists of the inverted output of the second limiting stage with the axis of symmetry restored to the zero axis by adding direct voltages equal to $-x+y$ to the output of the second limiting amplifier. The $y$ voltage is fed through the resistor 108 to effectively restore the axis of symmetry to axis as shown in FIG. 6. The average value of the output voltage is proportional to the product of $x$ and $y$ plus a proportionate amount of $x$ voltage.

It is necessary to adjust the amount of $x$ voltage fed into the amplifier 6 in order to achieve multiplication, since if the same amount of $x$ is supplied to the amplifier 6 as is supplied to the amplifier 4, the output of the amplifier 6 contains an undesired amount of $x$ voltage as wall as the product voltage $xy$. The necessary adjustment of $x$ can be computed by determining the net area under the curve shown in FIG. 6.

The positive area, trapezoid NUWS, equals the area of triangle NRS less the area of triangle URW.

The area of triangle $$NRS=\frac{TE}{4} \qquad (10)$$

where E is the amplitude of the triangular wave, and $$\frac{T}{2}=LN=NS$$

is the half period of the wave.

The altitude of triangle $$URW=[(E-50)-(x-y)] \qquad (11)$$

The base of triangle $$URW=[(E-50)-(x-y)]\frac{T}{2E} \qquad (12)$$

The area of triangle $$URW=[(E-50)-(x-y)]^2\frac{T}{4E} \qquad (13)$$

therefore, the area of trapezoid $$NUWS=\frac{TE}{4}-[(E-50)-(x-y)]^2\frac{T}{4E} \qquad (14)$$

The negative area, trapezoid NLQP equals the area of triangle LMN less the area of triangle MPQ.

The area of triangle $$LMN=\frac{TE}{4} \qquad (15)$$

The altitude of triangle $$MPQ=(E-50)+(x+y) \qquad (16)$$

The base of triangle $$MPQ=[(E-50)+(x+y)]\frac{T}{2E} \qquad (17)$$

The area of triangle $$MPQ=[(E-50)+(x+y)]^2\frac{T}{4E} \qquad (18)$$

therefore, the area of trapezoid $$LNQP=\frac{TE}{4}-$$

$$[(E-50)+(x+y)]^2\frac{T}{4E} \qquad (19)$$

The net area for one cycle equals the area of trapezoid NUWS less the area of trapezoid LNQP.

$$NUWS-LNQP=\frac{TE}{4}-[(E-50)-(x-y)]^2\frac{T}{4E}-\frac{TE}{4}+[(E-50)+(x+y)]^2\frac{T}{4E} \qquad (20)$$

which reduces to $$NUWS-LNQP=\frac{T}{E}(xy+(E-50)x)$$

The term $(E-50)x$ is unwanted and must be balanced out to achieve multiplication. Since the result obtained by subtracting $$\frac{T}{E}(E-50)x$$

from the output of amplifier 6 with $-x$ supplied to the input is identical with the result obtained by supplying $$\left[\frac{1}{E}(E-50)-1\right]x$$

to the input, the latter method is chosen as an additional amplifier need not then be used for substracting. With the $x$ input to amplifier 6 adjusted by having the gain of amplifier 7 equal $$\left[\frac{1}{E}(E-50)-1\right]=c$$

the output $E_o$ then becomes $$E_o=\frac{T}{E}xy \qquad (22)$$

The output of amplifier 6, with the $x$ voltage adjusted so as to eliminate the undesired term, is then filtered to provide the average value of the output voltage. The average value $E_f$ of the output voltage $E_o$ is $$E_f=\frac{xy}{E}=kxy$$

It will thus be seen that the arrangement of amplifiers disclosed in FIG. 2 provides an output voltage which when filtered is proportional to the product of two variable voltages.

FIG. 7 illustrates a means for employing the multiplier of the invention as a divider providing a voltage equal or proportional to the quotient of two variable voltages.

The multiplier, which has been previously described with reference to FIG. 2, is shown generally at 31. The multiplier 31 is shown as having input connections 31' and 32, corresponding to the $x$ and $y$ inputs described hereinabove, and an output connection 33. The denominator voltage "$a$" is applied to input connection 31'. A computing amplifier 34, similar to amplifier 6 of FIG. 2, receives the output of the multiplier 31 through an input resistor 35 which preferably is related to the feedback resistor 36 in the following manner:

$$R_i=KR_f$$

The numerator voltage "$b$" is applied to input resistor 37. The output voltage $-Z$ of amplifier 34 is inverted by amplifier 40, thus providing $+Z$, and applied to the remaining input resistor 38 of amplifier 34. The output $+Z$ of amplifier 40 is also supplied to the input 32 of multiplier 31.

The arrangement of FIG. 7 provides a quotient voltage Z equal to the ratio of the $b$ voltage to the $a$ voltage as follows:

The output of $-Z$ of amplifier 34 is $$-Z=-(b+Za+Z) \qquad (23)$$

Equation 23 reduces to $$-Z=\frac{b}{a} \qquad (24)$$

FIG. 8 illustrates an arrangement whereby the square root $b$ of a voltage $b^2$ can be extracted.

This arrangement comprises a multiplier 31, and three computing amplifiers 45, 50 and 55, similar to amplifier 34 of FIG. 7. The output of multiplier 31 is connected to input resistor 46 of amplifier 45. The value of the feedback resistor 47 is preferably in the ratio of $1/K$ to the value of input resistor 46.

The voltage $b^2$, the square root of which is to be extracted, is applied to input resistor 48 of amplifier 50, the output $-Z$ of which is inverted by amplifier 55 to provide $+Z$. The output of amplifier 45 is connected to input resistor 49, and the output $+Z$ of amplifier 55 is connected to input resistor 52. The output of amplifier 55 is also connected to the $x$ input 31' and the $y$ input 32 of the multiplier 31.

The output $-Z$ of amplifier 50 is therefore $$-Z=-(+b^2-Z^2+Z) \qquad (25)$$

which reduces to $$Z=\sqrt{b^2}=b \qquad (26)$$

It will be apparent from the preceding description that an analogue computer is provided for the performance of the various operations of arithmetic, which permits the use of ordinary high-gain, high impedance amplifiers and standard circuit components, and which may be regulated and balanced by standard techniques to maintain a high degree of stability in operation.

It will also be apparent that the embodiments shown are only exemplary and that various modifications can be made in construction and arrangement within the scope of the invention as defined in the appended claims.

What is claimed is:

1. An electronic system for multiplying two variables, consisting of means for generating a voltage having a periodic triangular wave form, means for adding a bias voltage to said periodic voltage thereby providing a biased periodic triangular wave, the magnitude of said bias voltage being determined by the first of said variables and for limiting the amplitude of said biased wave according to the second of said variables, and means for filtering said biased, limited wave to provide the average value thereof.

2. An electronic system for multiplying a first variable voltage by a second variable voltage, comprising a source of periodic voltage of a triangular wave form having a higher frequency than said variable voltages, a first computing amplifier including limiting means for adding said variable voltages to said periodic voltage and limiting the sum thereof, a second computing amplifier connected to said first amplifier and including limiting means for adding a voltage quantity of said first variable voltage proportional thereto to the output of said first amplifier and limiting the sum of said quantity and said output, said first and second amplifiers being operative to invert the value of their associated voltages, a third computing amplifier for adding a quantity of said first variable voltage proportional thereto and a quantity of said second variable voltage proportional thereto to the output of said second amplifier, and a filter connected to the output of said third amplifier for measuring the average value thereof.

3. An electronic system for multiplying a first variable voltage by a second variable voltage, comprising a source of triangular variable voltage of short period relative to the variation of first and second voltages, a first adder for summing said first, second and triangular voltages and inverting the sum, said adder including limiting means for limiting the maximum negative excursion of the resulting waveform to a predetermined value, a second adder for combining said resulting wave form with a voltage equal to twice the value of said second voltage and inverting the sum, said second adder including means for limiting the maximum negative excursion of the second resulting waveform, and a third adder for combining said second resulting waveform with an inverted voltage proportional to said first voltage and with said second voltage to produce a third resulting waveform, and means for filtering said third resulting waveform to provide an average value thereof which is proportional to the product of said first and second voltages.

4. The invention according to claim 3, each said adder including an amplifier and a feedback circuit.

5. The invention according to claim 4, the limiting means of said first and second adders comprising a cathode follower whose input is the output of the adder, and said feedback circuit being connected between the output of said cathode follower and the input of the associated adder.

References Cited in the file of this patent

UNITED STATES PATENTS 2,674,409 Lakatos ---------------- Apr. 6, 1954

OTHER REFERENCES

"Electronic Analog Computers" (Korn and Korn), pub. by McGraw-Hill Book Co., 1952, pgs. 220–233.

A New Electronic Multiplication Method (Mills), Magnolia Petroleum Co. Technical Report No. 680-(00)–4, November 1953.

Electronic Analog Computer (Korn and Korn) page 232, pub. by McGraw-Hill Book Co., New York, 1952.